(12) United States Patent
Kim et al.

(10) Patent No.: US 8,451,772 B2
(45) Date of Patent: May 28, 2013

(54) APPARATUS AND METHOD FOR SUPPORTING FREQUENCY REARRANGEMENT IN WIRELESS COMMUNICATION SYSTEM

(75) Inventors: Young-Ky Kim, Seoul (KR); Jae-Ho Jeon, Seongnam-si (KR); Il-Whan Kim, Incheon (KR); Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 12/658,650

(22) Filed: Feb. 12, 2010

(65) Prior Publication Data

US 2010/0208717 A1    Aug. 19, 2010

(30) Foreign Application Priority Data

Feb. 13, 2009    (KR) .................. 10-2009-0011665

(51) Int. Cl.
 *H04B 7/212*    (2006.01)
(52) U.S. Cl.
 USPC ........................................... 370/324

(58) Field of Classification Search
 USPC ........................................... 370/324
 See application file for complete search history.

(56) References Cited

U.S. PATENT DOCUMENTS

| | | | |
|---|---|---|---|
| 5,805,644 A * | 9/1998 | Tagawa ................. | 375/354 |
| 2003/0207681 A1* | 11/2003 | Rowitch ................ | 455/404.2 |
| 2005/0282581 A1* | 12/2005 | Simmons et al. ........ | 455/556.1 |
| 2006/0153139 A1* | 7/2006 | Bae et al. ............. | 370/335 |
| 2007/0104298 A1* | 5/2007 | Filipovic et al. ...... | 375/344 |
| 2009/0202010 A1* | 8/2009 | Fu et al. .............. | 375/260 |
| 2009/0207808 A1* | 8/2009 | McCann et al. ......... | 370/331 |

* cited by examiner

*Primary Examiner* — Mark Rinehart
*Assistant Examiner* — Angel Brockman (57) ABSTRACT

A base station includes a center frequency setting unit, a local oscillator, a baseband processor, and an RF processor. In the event of a frequency band change, the center frequency setting unit sets a center frequency of a use frequency channel to have a predetermined offset value with respect to a center frequency before the frequency band change. The local oscillator generates an LO frequency signal according to the center frequency set by the center frequency setting unit. The baseband processor generates a downlink baseband signal. The RF processor uses the LO frequency signal to convert the downlink baseband signal into an RF signal prior to transmission.

20 Claims, 6 Drawing Sheets

DOWNLINK

FIG.1A

UPLINK

APPARATUS AND METHOD FOR SUPPORTING FREQUENCY REARRANGEMENT IN WIRELESS COMMUNICATION SYSTEM

CROSS REFERENCE TO RELATED APPLICATION(S) AND CLAIM OF PRIORITY

The present application claims priority under 35 U.S.C. §119 to an application filed in the Korean Intellectual Property Office on Feb. 13, 2009 and assigned Serial No. 10-2009-0011665, the contents of which are incorporated herein by reference.

TECHNICAL FIELD OF THE INVENTION

The present invention relates generally to an apparatus and method for supporting frequency rearrangement in a wireless communication system, and in particular, to an apparatus and method for preventing the access of a mobile station (MS) whose frequency band is not corrected (or discarded) in the event of frequency rearrangement.

BACKGROUND OF THE INVENTION

Mobile communication technologies are evolving to provide higher-rate, higher-quality data services than the conventional systems and solve implementational issues. The second-generation digital cellular mobile communication systems improved the voice quality and the channel capacity of the analog cellular mobile communication systems and provided voice and low-rate data services. The third-generation IMT-2000 has provided not only voice services but also multimedia services such as video services and high-rate data services including Internet services. European W-CDMA (or UMTS), North American CDMA 2000 1× and 1× EV-DO, and CDMA 2000 1× EV-DV have been researched and developed as the third-generation communication technologies. The fourth-generation mobile communication technologies, following the IMT-2000, are expected to provide more convenient, higher-quality services at lower costs than the conventional technologies.

The 3GPP, undertaking UMTS standardization, is being standardizing an LTE system as the next generation mobile communication system of the UMTS. Herein, the LTE system is an OFDM-based communication system.

In this manner, mobile communication systems are evolving from CDMA-based communication systems to OFDM-based communication systems. Thus, mobile communication service providers are completing to acquire a frequency band for initiation of an OFDM-based mobile communication service. When the mobile communication service providers use a frequency band to provide a communication service, they must pay the fee for the use of the frequency band.

Thus, the mobile communication service providers reduce the frequency use fee by reallocating frequencies or by returning/rearranging unused frequencies or frequencies that are expected to be used less frequently.

If a service band changes due to the frequency return/rearrangement/reallocation, the mobile communication service providers must make a determination reflecting the service maintenance of a conventional system terminal and the spectral efficiency according to the introduction of a new system.

Figure 1A:
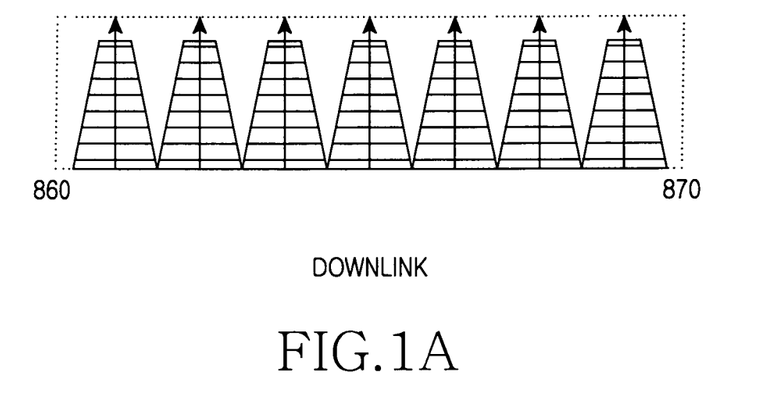
FIGS. 1A and 1B illustrate an example of the frequency band operation of a service provider.
Figure 1B:
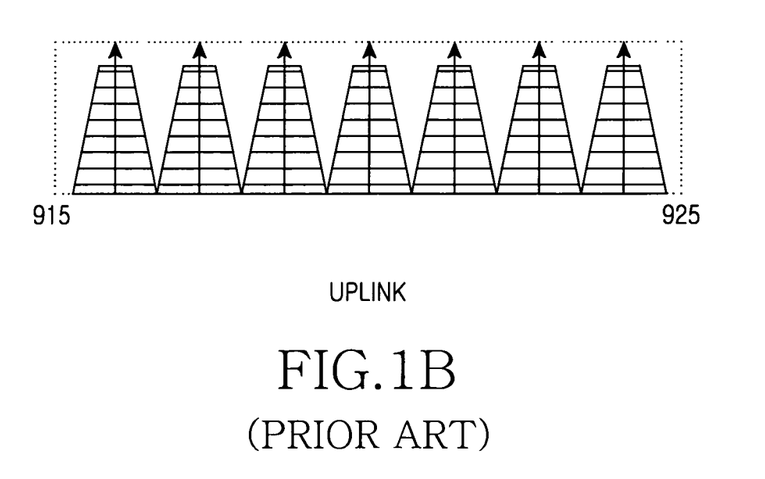

FIGS. 1A and 1B illustrate an example of the frequency band operation of a service provider.

FIGS. 1A and 1B illustrate the frequency arrangement in the case of using only a conventional system (e.g., a CDMA-based system). FIG. 1A illustrates an 860 MHz~870 MHz band allocated for downlink (or forward link) communication, and FIG. 1B illustrates a 915 MHz~925 MHz band allocated for uplink (or reverse link) communication.

A mobile communication service provider may change the frequency band operation of FIGS. 1A and 1B in order to introduce a new system (e.g., an OFDM-based system). For example, the mobile communication service provider may maintain the currently-used downlink band and return (or reallocate) the previously-used uplink band. If a service band changes, the MSs served in a conventional band must be discarded (or corrected). That is, the MS and the BS of a conventional system must be corrected to receive a service in a changed band. If an uncorrected (or undiscarded) MS attempts an access after the frequency rearrangement, an uplink signal of the uncorrected (or undiscarded) MS may cause an interference in the returned band.

What is therefore required is a scheme for preventing a problem that may be caused by an MS that is not corrected (or discarded) in a frequency rearrangement process.

SUMMARY OF THE INVENTION

To address the above-discussed deficiencies of the prior art, it is a primary object to provide at least the advantages below. Accordingly, an object of the present invention is to provide an apparatus and method for supporting frequency rearrangement in a wireless communication system.

Another object of the present invention is to provide an apparatus and method for preventing the access of an MS whose frequency band is not corrected in the event of frequency rearrangement in a wireless communication system.

Another object of the present invention is to provide an apparatus and method for preventing the access of an MS whose frequency band is not discarded in the event of frequency rearrangement in a wireless communication system.

Another object of the present invention is to provide an apparatus and method for correcting a center frequency to prevent the access of an MS whose frequency band is not corrected in the event of frequency rearrangement in a wireless communication system.

Another object of the present invention is to provide an apparatus and method for correcting a center frequency to prevent the access of an MS whose frequency band is not discarded in the event of frequency rearrangement in a wireless communication system.

According to an aspect of the present invention, an apparatus for a BS in a wireless communication system includes: a center frequency setting unit that sets, in the event of a frequency band change, a center frequency of a use frequency channel to have a predetermined offset value with respect to a center frequency before the frequency band change; a local oscillator that generates an LO frequency signal according to the center frequency set by the center frequency setting unit; a baseband processor that generates a downlink baseband signal; and an RF processor that uses the LO frequency signal to convert the downlink baseband signal into an RF signal prior to transmission.

According to another aspect of the present invention, a method for transmission of a BS in a wireless communication system includes: setting, in the event of a frequency band change, a center frequency of a use frequency channel to have a predetermined offset value with respect to a center frequency before the frequency band change; generating an LO frequency signal according to the set center frequency set;

generating a downlink baseband signal; and using the LO frequency signal to convert the generated downlink baseband signal into an RF signal prior to transmission.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2A through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

The present invention provides a scheme for preventing the access of an uncorrected (or undiscarded) MS (hereinafter referred to as "old MS") of a conventional system in the event of frequency rearrangement due to the introduction of a new system in a wireless communication system.

The following description assumes that a new system is an LTE system and a conventional system is a CDMA 1×EV-DO system. However, the new system and the conventional system may be variously defined as 3GPP systems, 3GPP2 systems and IEEE802.16 systems. For example, the conventional system may be an UMTS system and the new system may be an IEEE 802.16e system.

Figure 2A:
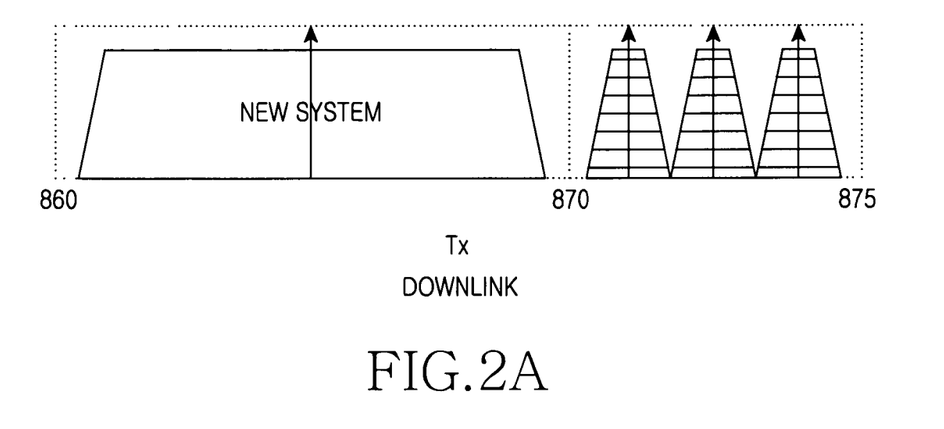
FIGS. 2A and 2B illustrate an example of the frequency band operation for supporting an old system and a new system, according to the present invention.
Figure 2B:
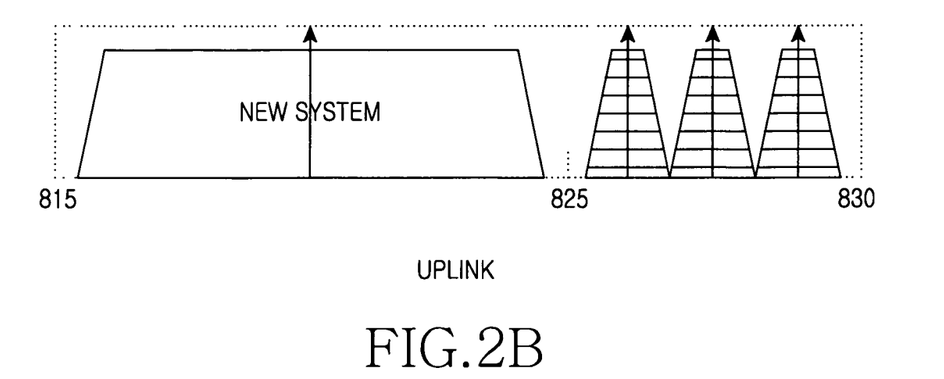

FIGS. 2A and 2B illustrate an example of the frequency band operation for supporting a conventional system and a new system, according to the present invention.

FIG. 2A illustrates an 860 MHz~875 MHz band for downlink (or forward link) communication and FIG. 2B illustrates an 815 MHz~830 MHz band for uplink (or reverse link) communication.

As illustrated in FIG. 2A, for downlink communication, the new system (the LTE system) may use an 860 MHz~870 MHz band and the conventional system (the CDMA 1× EV-DO system) may use an 870 MHz~875 MHz band.

As illustrated in FIG. 2B, for uplink communication, the new system (the LTE system) may use an 815 MHz~825 MHz band and the conventional system (the CDMA 1× EV-DO system) may use an 825 MHz~830 MHz band.

In the above exemplary embodiment, the wireless communication system allocates a 10 MHz band to each of the uplink and the downlink for the new system and allocates a 5 MHz band to each of the uplink and the downlink for the conventional system. However, the frequency arrangement of FIGS. 2A and 2B is merely exemplary and may vary according to embodiments.

The following description assumes a change from the frequency arrangement of FIGS. 1A and 1B to the frequency arrangement of FIGS. 2A and 2B. In this case, an MS of the conventional system must change the uplink and downlink bands. For example, the MS of the conventional system must change the uplink band from 915 MHz~925 MHz to 825 MHz~830 MHz. As another example, the MS of the conventional system must change the downlink band from 860 MHz~870 MHz to 870 MHz~875 MHz.

The present invention is to prevent the MS of the conventional system from transmitting signals through the conventional uplink band in the initial state of the change of the frequency band operation from FIGS. 1A and 1B to FIGS. 2A and 2B. Also, the present invention is intended to gradually increase/decrease the band of the new/conventional system according to an increase in the number of subscribers of the new system in the wireless communication system when the conventional system and the new system share a specific band as illustrated in FIGS. 2A and 2B.

Figures 3A, 3B:
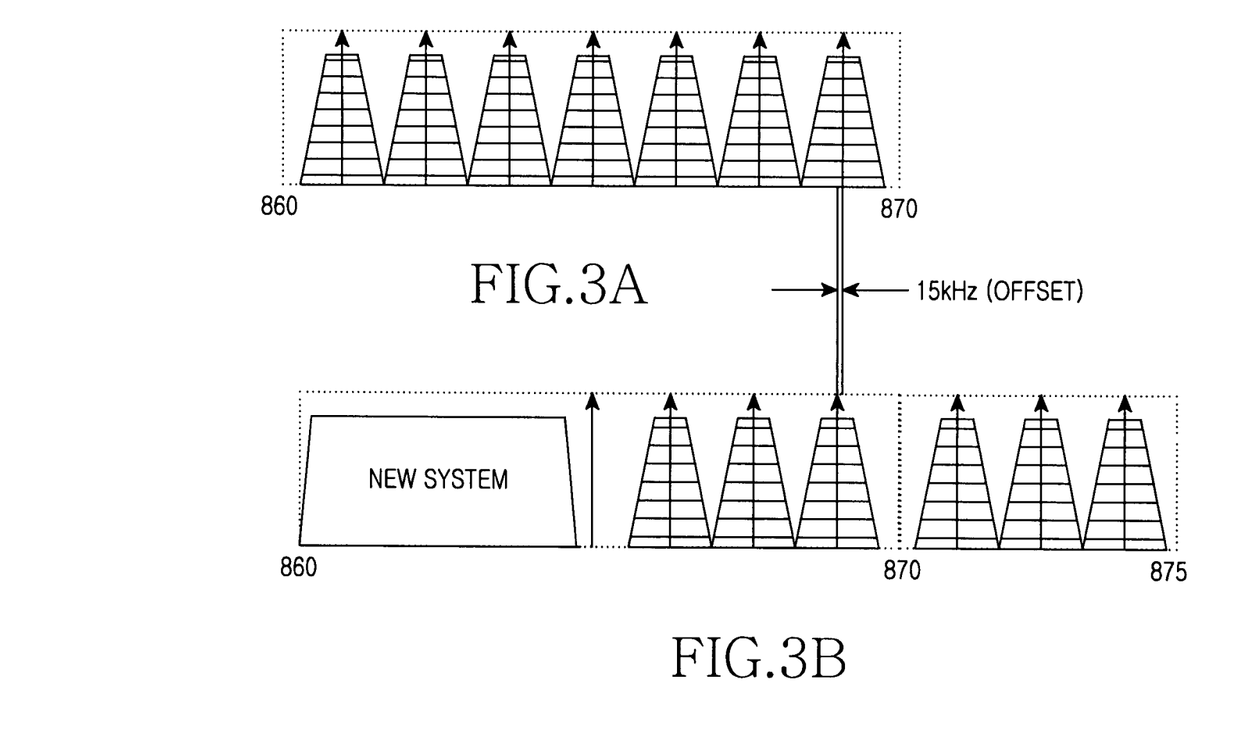
FIGS. 3A and 3B illustrate an example of the downlink band change in the initial stage of the introduction of a new system, according to the present invention.

FIGS. 3A and 3B illustrate an example of the downlink band change in the initial stage of the introduction of a new system, according to the present invention. FIG. 3A illustrates an example of the downlink band operation before the introduction of a new system, and FIG. 3B illustrates an example of the downlink band operation after the introduction of a new system.

Referring to FIGS. 3A and 3B, in the event of the introduction of a new system, the wireless communication system divides a frequency band, which is allocated to the service provider, into a band for the new system and a band for the conventional system.

In the initial stage of the introduction of the new system, because the number of subscribers of the new system is small, the wireless communication system may allocate the band for the new system to be smaller than the band for the conventional system.

In general, an MS acquires information (or synchronization) for communication from a downlink signal received from a BS. Thereafter, the MS uses the acquired information (synchronization) for communication to receive a downlink signal or transmit an uplink signal.

As described above, it is necessary to prevent an old MS from receiving a downlink signal in order to prevent the uplink access of the old MS. Accordingly, as illustrated in FIG. 3B, the wireless communication system shifts a center frequency of the conventional system by a predetermined offset (e.g., 15 kHz) to rearrange frequencies and prevents the old MS from receiving downlink signals. In this case, because the center frequency is shifted, the old MS whose service band is not corrected (or discarded) cannot receive a downlink signal and thus cannot transmit an uplink signal. Herein, the predetermined offset is determined considering space per tone.

In FIGS. 3A and 3B, the wireless communication system may shift only the downlink band of the conventional system in FIG. 3B, which overlaps with the downlink band of the conventional system in FIG. 3A, by a predetermined offset.

Figure 4A:
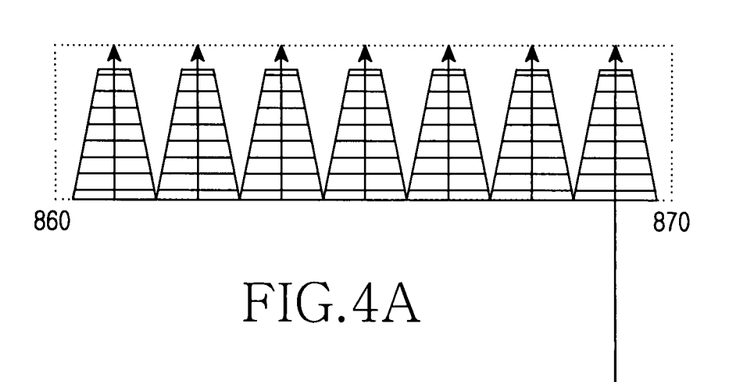
FIGS. 4A and 4B illustrate an example of the frequency band operation according to an increase in the number of subscribers of a new system, according to the present invention.
Figure 4B:
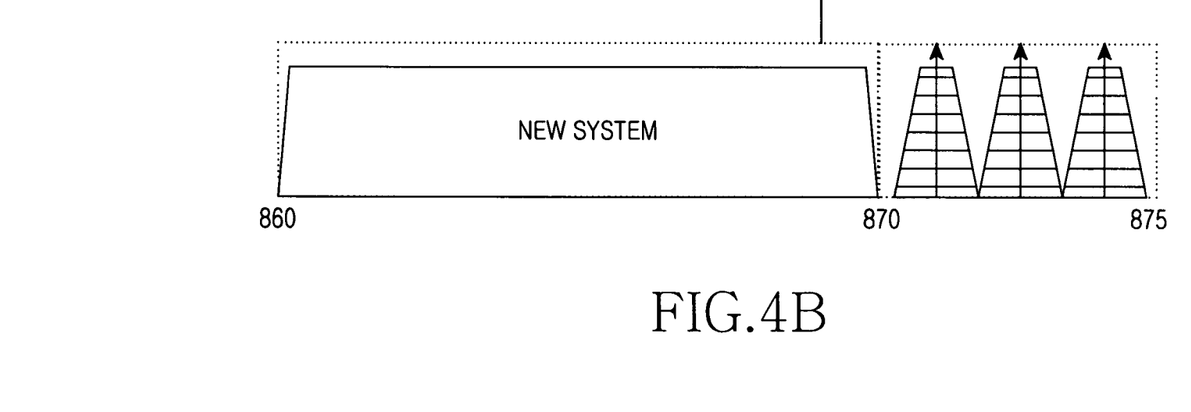

Meanwhile, if the number of subscribers of the new system increases and the number of subscribers of the conventional system decreases, the wireless communication system may change the frequency band arrangement as illustrated in FIGS. 4A and 4B.

FIGS. 4A and 4B illustrate an example of the frequency band operation according to an increase in the number of subscribers of a new system, according to the present invention. FIG. 4A illustrates an example of the downlink band operation before the introduction of a new system, and FIG. 4B illustrates an example of the downlink band operation after the introduction of a new system.

If the number of subscribers of the new/conventional system increases/decreases, the wireless communication system may increase/decrease the use band of the new/conventional system in the frequency arrangement of FIG. 3B as illustrated in FIG. 4B.

A description will now be given of an exemplary embodiment based on the above.

Figure 5:
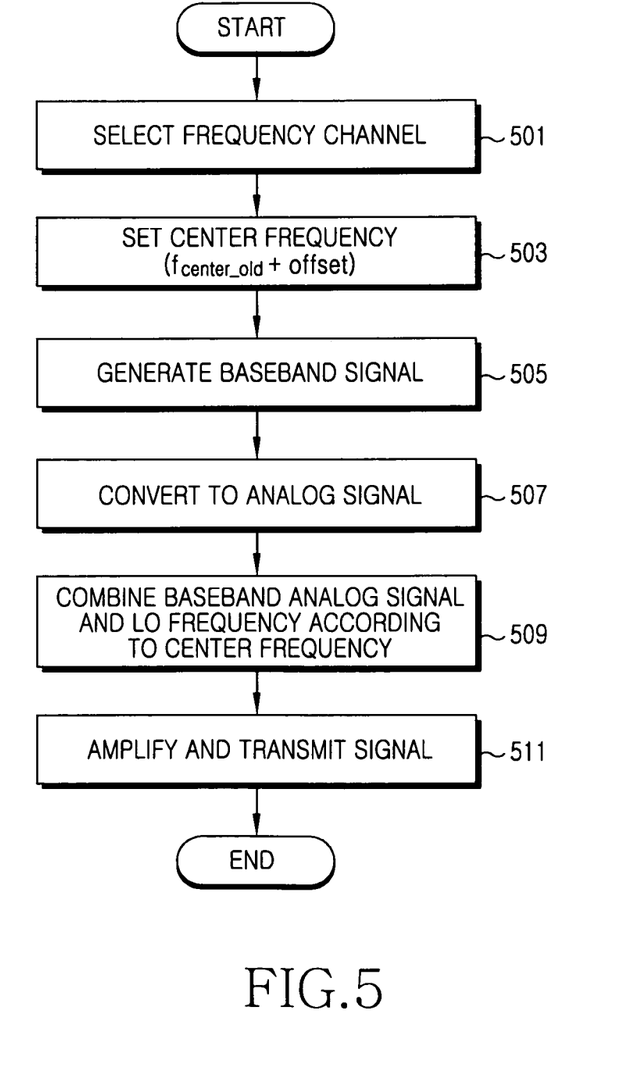
FIG. 5 illustrates a BS operation process in an old system according to an exemplary embodiment of the present invention.

FIG. 5 illustrates a BS operation process in an old system according to an exemplary embodiment of the present invention. The following description is given of a process for a BS of a conventional system to provide a service by shifting a center frequency by a predetermined value in the event of frequency rearrangement due to the introduction of a new system.

Referring to FIG. 5, in the event of frequency resetting or initial frequency setting according to system installation, the BS selects a service frequency channel (FA) in step 510. For example, if the number of frequency channels usable by the BS is '6' as illustrated in FIG. 3B, the BS may select one of the six frequency channels as a service frequency channel. As another example, if the BS supports a multicarrier (MC), the MS may select at least one of the six frequency channels as a service frequency channel. Specifically, the frequency channel used by the BS may be inputted by an operator into a network manager and may be transferred from the network manager to the corresponding BS.

Thereafter, in step 503, the BS sets a center frequency according to the selected frequency channel. For example, the BS sets a center frequency of the selected frequency channel so that it is shifted by an offset value than a center frequency $f_{center\_old}$ used in the conventional band before frequency rearrangement. Herein, the BS may set a center frequency of the selected frequency channel so that it is shifted by an offset than a center frequency $f_{center\_old}$ used in the conventional band before frequency rearrangement, with respect to only the frequency band overlapping with the downlink band illustrated in FIG. 3A, among the frequency bands changed through frequency rearrangement as illustrated in FIG. 3B. Specifically, if the center frequency of the frequency channel is changed due to frequency rearrangement, the operator may correct the center frequency through an operator terminal (network manager). In this case, the network manager may transfer the corrected center frequency value to the BS or may transfer the offset value for center frequency change to the BS.

When a service is initiated, the BS generates a baseband signal to be transmitted through a downlink, in step 505.

Thereafter, in step 507, the BS converts the baseband digital signal into a baseband analog signal.

Thereafter, in step 509, the BS converts the baseband analog signal into a radio frequency (RF) signal by using a LO frequency signal according to the set center frequency $f_{center\_old}$+offset. For example, the BS directly converts the baseband signal into an RF signal. As another example, the BS converts the baseband signal into an intermediate frequency (IF) signal and converts the IF signal into an RF signal.

Thereafter, in step 511, the BS amplifies the RF signal and transmits the resulting signal through an antenna.

The old MS whose service is not corrected (or discarded) searches frequencies in units of 30 kHz from the conventional center frequency. Herein, because the old MS cannot transmit an uplink signal because it cannot acquire the synchronization of the BS with a shifted center frequency.

Figure 6:
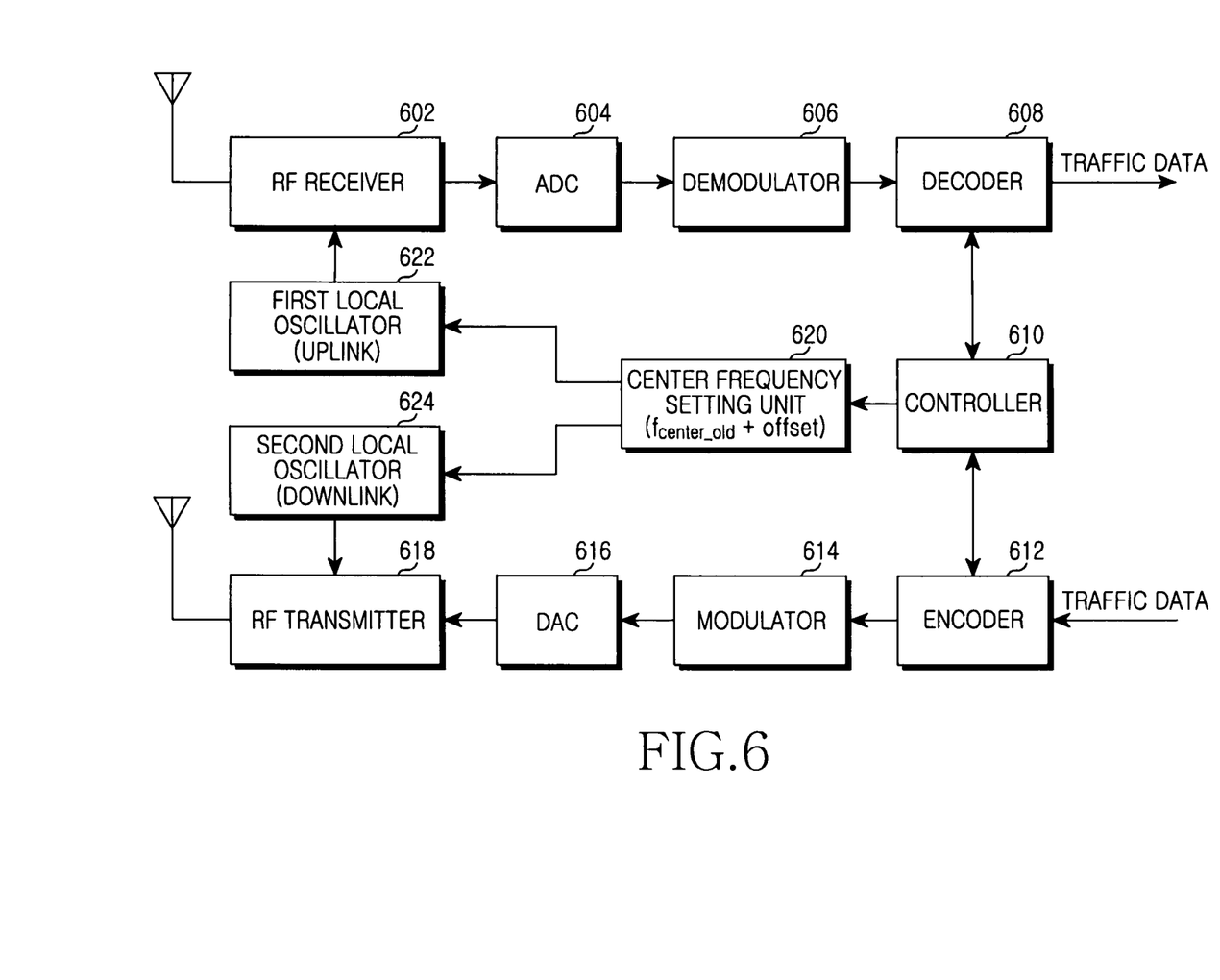
FIG. 6 illustrates a BS in an old system according to an exemplary embodiment of the present invention.

FIG. 6 illustrates a BS in an old system according to an exemplary embodiment of the present invention. The following description is given of a structure for a BS of a conventional system to provide a service by shifting a center frequency by a predetermined value in the event of frequency rearrangement due to the introduction of a new system.

Referring to FIG. 6, the BS includes an RF receiver 602, an analog-to-digital converter (ADC) 604, a demodulator 606, a decoder 608, a controller 610, an encoder 612, a digital-to-analog converter (DAC0 616, an RF transmitter 618, a center frequency setting unit 620, a first local oscillator (LO) 622, and a second local oscillator 624.

The RF receiver 602 uses an uplink LO frequency signal, received from the first local oscillator 622, to convert an RF signal, received through an antenna, into a baseband analog signal.

The ADC 604 converts the baseband analog signal, received from the RF receiver 602, into a digital signal (sample data).

The demodulator 606 baseband-demodulates the digital signal received from the ADC 604 and outputs the result. For example, the demodulator 606 may generate code data by demodulating received data by long code modulation, OVSF code demodulation and modulation symbol demodulation.

The decoder 608 channel-decodes the code data, received from the demodulator 606, to restore the original information data. Herein, if the information data are traffic data, the decoder 608 transfers the information data to a protocol processor. Alternatively, if the information data are a signaling message, the decoder 608 provides the information data to the controller 610.

The controller 610 controls an overall operation of the BS. For example, the controller 610 may interpret a signaling message, received from an MS, to control the corresponding operation and may generate a transmission signaling message and transmit the same to the encoder 612.

The encoder 612 channel-encodes transmission traffic data and the transmission signaling message received from the controller 610 and outputs the results.

The modulator 614 baseband-modulates the code data received from the encoder 612 and outputs the result. For example, the modulator 614 may convert the code data into a demodulation symbol, modulate the modulation symbol by a channelization code (e.g., an OVSF code) and spread the resulting data by an uplink scrambling code.

The DAC 616 converts the baseband digital signal, received from the modulator 614, into a baseband analog signal and outputs the baseband analog signal.

The RF transmitter 618 uses a downlink LO frequency signal, received from the second local oscillator 624, to convert a baseband signal, received from the DAC 616, into an RF signal and transmits the RF signal.

Meanwhile, if frequency allocation information is received from a network manager (e.g., OMC) due to frequency rearrangement, the controller 610 provides the frequency allocation information to the center frequency setting unit 620. For example, the frequency allocation information may include a service frequency channel number (FA number) and an offset value for change of a center frequency.

The center frequency setting unit 620 selects a service frequency channel under the control of the controller 610 and sets a center frequency according to the selected frequency channel. If a center frequency change is necessary due to frequency rearrangement, the center frequency setting unit 620 changes a center frequency of the corresponding frequency channel by an offset value. Also, if the downlink and the uplink use different bands, the center frequency setting unit 620 may change a center frequency of the frequency channel for each of the downlink and the uplink by an offset value. Also, the center frequency setting unit 620 may set a center frequency of the selected frequency channel so that it is shifted by an offset, other than a center frequency $f_{center\_old}$ used in the conventional band before frequency rearrangement, with respect to only the frequency band overlapping with the downlink band illustrated in FIG. 3A, and among the frequency bands changed through frequency rearrangement as illustrated in FIG. 3B. Herein, the offset is determined considering space per tone.

The first local oscillator 622 generates and provides an uplink LO frequency signal to the RF receiver 602 according to the center frequency setting of the center frequency setting unit 620. The second local oscillator 624 generates and provides a downlink LO frequency signal to the RF transmitter 618 according to the center frequency setting of the center frequency setting unit 620.

As described above, the present invention can prevent the access of the uncorrected (or undiscarded) MS (i.e., the old MS) of the conventional system in the event of frequency rearrangement due to the introduction of the new system in the wireless communication system. That is, the present invention can prevent the interference with the returned frequency due to the access of the old terminal.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A base station (BS) in a wireless communication system, the base station comprising:
a center frequency setting unit configured to set, in the event of a frequency band change, a center frequency of a use frequency channel to have a predetermined offset value with respect to a center frequency before the frequency band change;
a local oscillator configured to generate a local oscillation (LO) frequency signal according to the center frequency set by the center frequency setting unit;
a baseband processor configured to generate a downlink baseband signal; and
a radio frequency (RF) processor configured to use the LO frequency signal to convert the downlink baseband signal into an RF signal prior to transmission,
wherein the center frequency having the predetermined offset value is configured to allow communication with a first MS while restricting the first MS from communicating with the BS using the center frequency before the frequency band change.

2. The base station of claim 1, wherein the center frequency setting unit is configured to set the center frequency of the use frequency channel to have a predetermined offset value determined according to a space per a tone.

3. The base station of claim 2, wherein the center frequency setting unit is configured to set the center frequency of the use frequency channel to have a predetermined offset value of approximately 15 kHz, the wireless communication system comprising a CDMA system.

4. The base station of claim 1, wherein the center frequency setting unit is configured to set the center frequency of the use frequency channel to have the predetermined offset value when the use frequency channel is selected from the frequency band overlapping with the frequency band before the frequency band change among the changed frequency bands.

5. The base station of claim 1, wherein a first band is configured to be used for a second MS operating a specific frequency band in the wireless communication system in a distributed manner, a second band is configured to be used for a first MS, and the BS is configured to provide a service for the first MS through the second band.

6. The base station of claim 5, wherein the size of the first band and the size of the second band are adjusted according to the number of subscribers of the second MS and the number of subscribers of the first MS.

7. The base station of claim 5, wherein the first MS is configured to operate according to a CDMA 1× EV-DO protocol and the second MS is configured to operate according to an LTE protocol.

8. A method for transmission by a base station (BS) in a wireless communication system, the method comprising:
setting, in the event of a frequency band change, a center frequency of a use frequency channel to have a predetermined offset value with respect to a center frequency before the frequency band change;
generating a local oscillation (LO) frequency signal according to the set center frequency set;
generating a downlink baseband signal; and using the LO frequency signal to convert the generated downlink baseband signal into a radio frequency (RF) signal prior to transmission,
wherein the center frequency having the predetermined offset value allows communication with a first MS while restricting the first MS from communicating with the BS using the center frequency before the frequency band change.

9. The method of claim 8, wherein the offset value is according to a space per a tone of a frame structure of the frequency channel.

10. The method of claim 9, wherein the offset value is approximately 15 kHz, the wireless communication system comprising a CDMA system.

11. The method of claim 8, further comprising:
determining, before the setting of the center frequency, whether the use frequency channel is selected from the frequency band overlapping with the frequency band before the frequency band change among the changed frequency bands; and
setting the center frequency of the use frequency channel to have the predetermined offset value, when the use frequency channel is selected from the frequency band overlapping with the frequency band before the frequency band change.

12. The method of claim 8, wherein a first band is used for a second MS operating a specific frequency band in the wireless communication system in a distributed manner, a second band is used for the first MS, and the BS provides a service for the first MS through the second band.

13. The method of claim 12, wherein the size of the first band and the size of the second band are adjusted according to the number of subscribers of the second MS and the number of subscribers of the first MS.

14. The method of claim 12, wherein the first MS is configured to operate according to a CDMA 1× EV-DO protocol and the second MS is configured to operate according to an LTE protocol.

15. A base station (BS) comprising:
a center frequency setting unit configured to set, in the event of a frequency band change, a center frequency of a use frequency channel to have a predetermined offset value with respect to a center frequency before the frequency band change;
a local oscillator configured to generate a local oscillation (LO) frequency signal according to the center frequency set by the center frequency setting unit;
a baseband processor configured to generate a downlink baseband signal; and
a radio frequency (RF) processor configured to use the LO frequency signal to convert the downlink baseband signal into an RF signal prior to transmission,
wherein the center frequency having the predetermined offset value is configured to allow communication with a first MS while restricting the first MS from communicating with the BS using the center frequency before the frequency band change.

16. The base station of claim 15, wherein the center frequency setting unit is configured to set the center frequency of the use frequency channel to have a predetermined offset value determined according to a space per a tone of a frame structure of the frequency channel.

17. The base station of claim 16, wherein the center frequency setting unit is configured to set the center frequency of the use frequency channel to have a predetermined offset value of approximately 15 kHz, the wireless communication system comprising a CDMA system.

18. The base station of claim 15, wherein the center frequency setting unit is configured to set the center frequency of the use frequency channel to have the predetermined offset value when the use frequency channel is selected from the frequency band overlapping with the frequency band before the frequency band change among the changed frequency bands.

19. The base station of claim 15, wherein a first band is configured to be used for a second MS operating a specific frequency band in the wireless communication system in a distributed manner, a second band is configured to be used for the first MS, and the BS is configured to provide a service for the first MS through the second band.

20. The base station of claim 19, wherein the size of the first band and the size of the second band are adjusted according to the number of subscribers of the second MS and the number of subscribers of the first MS.

* * * * *